United States Patent
Giddey et al.

[15] 3,653,919
[45] Apr. 4, 1972

[54] PRODUCTION OF CHEESE CURD

[72] Inventors: Claude Giddey; Georges Dove, both of Geneva, Switzerland

[73] Assignee: Alfa-Laval AB, Tumba, Switzerland

[22] Filed: Aug. 19, 1969

[21] Appl. No.: 851,459

[30] Foreign Application Priority Data

Aug. 20, 1968 Switzerland..........................12497/68
July 23, 1969 Switzerland..........................11258/69

[52] U.S. Cl....................................................99/116, 99/20
[51] Int. Cl..........................................................A23c 19/02
[58] Field of Search......................................99/115–116, 14, 99/17, 20; 260/119, 120, 112

[56] References Cited

UNITED STATES PATENTS

| | | |
|---|---|---|
| 3,528,821 | 9/1970 | Stenne......................................99/116 |
| 3,298,836 | 1/1967 | Ernstrom..................................99/116 |
| 3,465,439 | 9/1969 | Wakeman et al......................99/116 X |
| 2,730,447 | 1/1956 | Boyer..........................................99/14 |
| 3,394,011 | 7/1968 | Richardson et al......................99/116 |
| 1,676,121 | 7/1928 | Heide.........................................99/116 |

Primary Examiner—A. Louis Monacell
Assistant Examiner—D. M. Naff
Attorney—Davis, Hoxie, Faithfull & Hapgood

[57] ABSTRACT

Concentrated milk with a dry substance content of about 30 percent is renneted at 15° to 30° C. for 5 to 15 minutes to insolubilize the casein and obtain a homogeneous non-gelled viscous mass, which is then cooled below 10° C.; and thereafter parallel streams of the renneted milk are heated rapidly to 25° to 45° C. to polymerize the casein and obtain curd in the streams. The curd is then washed in an aqueous bath, separated from the bath, and finally re-collected to form a homogeneous mass.

26 Claims, No Drawings

PRODUCTION OF CHEESE CURD

THE DISCLOSURE

The present invention relates to a continuous method of producing curd in connection with the making of cheese. The invention is an improvement of a known process in which the milk is first concentrated to a dry substance content of about 30 percent and which comprises the further steps of renneting the milk during a certain period of time, then heating it to a temperature of 25° to 45° C. in order to provoke the polymerization of the casein and while the renneted milk is divided into a number of parallel flows in order to bring about practically instantaneous heating, so that a curd in the form of parallel flows is obtained, washing the curd in an aqueous bath, separating the curd from the bath, and finally re-collecting the curd to form a homogeneous mass.

The improvement of the aforesaid method, according to the present invention, is characterized mainly in that the concentrated milk, before the heating to 25° to 45° C., is renneted at a temperature between 15° and 30° C. during a period of 5–15 minutes in order to bring about insolubility of the casein and obtain a homogeneous non-gelled viscous mass, which is then cooled to a temperature below 10° C.

It is well known that the traditional processes for production of curd in connection with cheese-making have several disadvantages. First, the different processes are performed in a discontinuous manner and thus require a large personnel. A second disadvantage is that these methods involve considerable problems in connection with the handling and storing of the milk that is being processed, as this milk contains a large proportion of water which is not to be included in the finished product. It has long been a desire to simplify these problems. A third disadvantage is that it is extremely difficult to obtain the same yield of cheese in relation to the dry substance content of the milk to be processed. This yield depends greatly upon the manner in which the cheese-forming curd is produced.

It has been attempted to improve the steps forming parts of the cheese-making process in order to eliminate these drawbacks. Those steps mainly are to make the milk coagulate, to separate the curd from the whey and to wash the curd. The coagulation of the milk entails a precipitation of micelles of polymerized calciumphosphocaseinate, an amorphous mass being formed which contains in an insoluble state the dry substance that is a constituent of the milk, among other substances. Thus, grains of curd are obtained consisting mainly of the constituents which will eventually make up the cheese, and whey is also obtained. The separation of the whey and the washing of the curd have the objective of completely removing the whey from the curd. The quality of the cheese finally obtained depends largely upon the extent to which the separation of the whey and the washing of the curd have been successful, and this again depends upon the physical properties of the curd. The physical properties of the curd are greatly dependent upon the manner in which the coagulation was brought about.

In the methods generally employed for producing curd, the coagulation is brought about by processes which usually depend more or less upon rules of thumb, and in which the results vary. Whether a curd of good quality will be obtained or not depends largely upon the skill of the personnel performing the processes.

One method in particular is known for a continuous production of curd from concentrated milk and which involves certain improvements whereby some of the difficulties mentioned above are eliminated. According to the latter method, whole milk is pasteurized and filtered, the fat content is standardized, the milk is concentrated to one-third of its original volume by means of evaporation in vacuum, the milk is cooled, cultures of bacteria intended to lower the pH value of the milk are mixed into it, the milk is ripened until the desired pH value is obtained, rennet is added at the low temperature and is left to act for a certain time, the milk finally being heated anew so as to provoke the formation of the curd. The heating of the concentrated, cooled and renneted milk is performed by quickly adding a measured quantity of hot water, or the concentrated, cooled and renneted milk is injected together with a flow of hot water at the upper part of a vertical coagulation column. The milk is coagulated when it contacts the hot water and more or less coherent grains of curd are formed, which are then left to agglomerate in order to transfer the soluble constituents of the milk to the water. This process enables a certain improvement of the cheese-making process in as much as the final product will be of a more homogeneous composition as to the dry substance content, and it also results in a more uniform yield. In addition, the manufacture is simplified.

This last-described method nevertheless solves only to some extent the existing problems. Even if it alleviates the first two disadvantages previously mentioned, the need nevertheless remains to make the different operations more rapid than is now the case, and this particularly applies to the coagulation of the milk, as in that way an optimum yield would be obtained. In the aforementioned process wherein the coagulation is effected by heating of the milk which has preferably been renneted at a low temperature, the coagulation does not take place quickly enough unless the rennet has been left to act upon the milk for a sufficiently long time, i.e., about 30 minutes or more. Some time is no doubt saved by this process when compared with the traditional processes of making cheese, in which the renneting takes a time of about 1½ hours, but the saving of time is not particularly great.

As to the third disadvantage which has been mentioned above, the last-described process entails a certain improvement in that the formation of curd can be repeated more uniformly than is the case when employing the traditional curd forming processes. It is nevertheless still equally difficult to obtain a curd of a good quality. Actually, the coagulation of the cold renneted milk takes place without any transition, and small grains are immediately formed in which the calciumphosphocaseinate micelles are joined together in a quite irregular manner, and it is therefore necessary to wait for the growth and agglomeration of the grains. During the period of growth or agglomeration of the grains, the curd is brittle and cannot be filtered, which makes it very difficult to obtain a curd of a quality that can be accurately reproduced. It is known, however, that the action of the rennet upon the milk comprises two phases. The first phase is called "the enzymatic phase," and the other is called "the non-enzymatic phase." During the first phase, which can take place in cold renneted milk, the casein particles of the milk are physically-chemically transformed, a modified form of the K-casein makes the final development of the coagulation phenomenon possible. During the run of the second phase, which cannot take place unless the milk has a sufficiently high temperature, the casein particles will immediately be made insoluble in the form of micelles, and the whole mass takes a homogeneous viscous consistency, but it does not coagulate. Finally, the casein micelles are polymerized with formation of calciumphosphocaseinate, and the mass transforms into gel form. As has been mentioned above, the non-enzymatic phase of the renneting, when performed in accordance with the known process last described, takes place without any transition between the state in which the casein micelles are made insoluble and the state in which the calciumphosphocaseinate micelles are polymerized in the moment when the milk to which rennet has previously been added is heated anew, to order to bring about the formation of curd proper.

The method according to the present invention provides an important improvement of the conditions in connection with formation of curd, since it permits a perfect control of the process and thereby makes it possible to produce a curd with completely reproducible properties, which is also particularly advantageous for the subsequent final ripening processes of the cheese-making. The new method comprises the steps of concentrating the milk to a dry substance content of at least about 30 percent, renneting the concentrated milk at a temperature between 15° and 30° C. for a period of 5–15 minutes in order to bring about insolubility of the casein and obtain a homogeneous viscous mass, which is not a gel, then cooling the viscous mass to a temperature below 10° C., flowing it in divided parallel streams while heating it anew rapidly or practically instantaneously to a temperature between 25° and 45° C., so that the polymerization of the casein is brought about and a curd is obtained which is divided into parallel continuous strings of relatively small thickness, washing the curd in a water solution for the time needed for the water solution to dissolve a quantity of material which is to be removed in order to make the particular type of cheese which is desired in the end, separating the water solution from the curd divided into strings, and finally collecting the strings into a homogeneous mass.

According to the present invention, the curd is thus obtained by letting the rennet act upon the milk at room temperature or thereabout for a time sufficient not only for the enzymatic phase to take place under the action of the rennet but also for the first part of the non-enzymatic phase to take place, i.e., the insolubilization of the casein by the formation of micelles. As soon as that state has been obtained which is indicated by the formation of a perfectly homogeneous viscous mass, the action of the rennet is stopped by cooling to a temperature below the temperature range in which the non-enzymatic phase will develop further. The cooling also results in the renneted mass becoming even more viscous, which is necessary for the next operation wherein there is finally brought about the formation of curd proper, i.e. the polymerization of the casein, which is the second part of the non-enzymatic phase of the action of the rennet. For that purpose, the viscous mass is caused to flow continuously while divided into parallel flows and while heating it to the temperature needed for the second part of the non-enzymatic phase to take place. The expression "divided into parallel flows" also implies that the flows can have the shape of strings or lamellas. In this way, a perfectly uniform and nearly instantaneous heating of the milk can be obtained due to the fact that the mass to be heated has a shape which offers a large heat exchanging surface in relation to its volume. In addition, a curd is obtained with a defined structure, the components of which are arranged in parallel in the direction of flow of the coagulating mass. Therefore, in contrast to the known curd forming processes, the method of the present invention not only enables a perfect reproduction of the conditions under which the curd formation is obtained, but also produces a curd having a special structure which is particularly well suited for the operation following the formation of curd in order to dissolve out of it such substances as are soluble in water.

It is very advantageous to heat the viscous mass in such a way that it is injected in the shape of threads or lamella-shaped jets into a heating bath, which also serves the purpose of washing and which is kept at a temperature within the range mentioned above, i.e. between 25° and 45° C. It is also possible to effect the heating quite apart from the washing operation, as by passing the homogeneous, viscous mass through a heat exchanger comprising a large number of fine channels, the cross sectional shape of which corresponds to the preferred form of the flows into which the mass is divided (they may have the shape of threads or lamellas). It is also possible to expose the mass, when flowing through an assembly of such channels, to the action of a high-frequency electric field, the frequency of which preferably is tuned to that of the resonance frequency of the water molecules, i.e. 2,450 or 915 MHz. The channels should be as thin as possible in view of the technical possibilities and the processing capacity of the desired plant. The gauge of the resulting threads or lamellas should not exceed about 2 mm.

The method according to the present invention is equally suitable for milk with a normal composition as to the fat content and for milk to which extra fat has been added. The dry substance content of about 30 percent previously mentioned corresponds to the lowest dry substance content to which the milk should be concentrated when utilizing the new method. Below that limit, the concentrated milk does not coagulate quickly enough as to make it possible to perform continuously the various operations that are needed in order to obtain a coagulation according to the invention. Preferably, whole milk concentrated to a dry substance content of 36 percent should be used, which corresponds approximately to a concentration to one-third of the original volume. The temperature at which the renneting is performed should preferably be about 25° C. The quantity of rennet that should be added to the concentrated milk depends upon the kind of cheese which it is desired to make from the obtained curd. The rennet addition should generally be in the amount of 0.01–0.1 percent by weight, calculated on the weight of the milk before it is concentrated. Preferably, the quantity of rennet is 0.03 percent by weight, calculated on the weight of the milk before it is concentrated. Rennet having a concentration that is generally called "1 per 10,000" is preferred. The viscosity of the uncoagulated viscous mass that has been obtained before the cooling can be estimated qualitatively, preferably by making a furrow on the surface of the mass, as by means of a metal spatula, and the proper viscosity is indicated if the mass then completely fuses or flows together again almost instantaneously. Quantitatively, the viscosity should have a value of about 90 centipoise at 25° C.

The liquid in which the curd is to be washed, and which may serve for the heating of the viscous mass, can be pure water or water containing some salt in solution. A solution of 500 mg. calcium-chloride per liter is preferably used. Possibly, water solutions can be used repeatedly after the washing of the curd. In that case, the solution may be kept at a composition which corresponds to that of ordinary whey, or whey diluted with a certain quantity of water.

One or more bacterial cultures intended to add organoleptic qualities to the product are generally inoculated in the curd. For that purpose, the suitable bacteria may be mixed either into the aqueous washing solution or into the concentrated milk before or during the renneting process.

The milk may be acidified before concentration or while it is being concentrated, either by the action of the acid-producing bacteria or by adding acids, preferably lactic acid, or a combination of those two means.

If desired, extra fat may be added to the curd obtained by the new method.

An example of the practice of the new method is as follows:

EXAMPLE

Pasteurized milk with a fat content of 3½ percent and a pH value of 6.6 is concentrated to one-third of its volume by means of evaporation at 30° C. The concentrated milk is then cooled to 25° C. and renneted by the addition of 0.03 percent rennet of the concentration "1 per 10,000" (calculated on the volume of the unconcentrated milk). The milk thus renneted is kept at the latter temperature for about 12 minutes, i.e., until a viscosity is obtained and qualitatively estimated as previously explained. That viscosity should correspond to a quantitative value of 90 centipoise at 25° C. Now the milk is quickly cooled to 7° C. and then injected into a water solution of calcium-chloride through a spinning nozzle. The spinning nozzle has 200 holes with a diameter of 0.2 mm. The aqueous calcium-chloride solution should contain about 500 mg. calcium-chloride per liter and have a temperature of 35° C., and the water solution also contains a culture of acidophilic bacteria of the type *Bacillus casei*. The fibers or threads thus formed are separated from the solution by means of straining, and they are then washed in double their volume of water and pressed into a cheese mold, in which the resulting cheese mass is left to ripen in the ordinary manner.

When heating the viscous mass by injecting it in the shape of threads or lamella-shaped jets into a bath at a temperature of 25° to 45° C., it is particularly advantageous to divide the viscous flow also perpendicularly to the direction of the flow in addition to its being divided into parallel flows in the spinning nozzle. This should be done immediately when the viscous mass is injected into the bath. This division perpendicularly to the direction of flow can easily be effected by any suitable means, such as a rotating knife mounted close to the spinning nozzle at its outlet side.

In order to obtain the absolutely maximal effect as regards heat exchange and washing action, when heating by injection into a bath at 25° to 45° C., the bath should be vigorously stirred during the injection. Constant stirring can, of course, be effected by any conventional stirring device, but it is preferably performed in a way such that the pieces of curd are entrained into a circular movement that will eventually lead to a gathering and separation of the curd particles from the bath.

The curd fibers obtained at the moment when the viscous milk is pressed through the spinning nozzle, or the cut pieces of fibers obtained when dividing the flow perpendicularly as well, provide the curd with an extremely suitable structure, because they make it easy to extract quickly and effectively the unwanted constituents of the curd by means of the water solution into which the fibers are "spun." This is largely due to the fact that the so-called syneresis takes place extremely quickly and effectively after the curd formation according to the present invention. Also, the ion exchanges and the inoculation of the bacterial culture that is intended to give the cheese its taste and final aroma are greatly facilitated. The same applies to all the subsequent operations that are traditionally performed, whether during or after the separation of the curd from the whey, and this is by virtue of the fibrous structure of the curd. The ripening of the cheese made from a curd obtained by the new process is facilitated and quickly results in a product of highest quality. The curd is very suitable for forming; and the fibers or pieces of fibers, which correspond to the conventionally obtained grains of curd, join well together and make a perfectly homogeneous mass. The ability of the curd to keep the wanted constituents of the milk, particularly the fatty constituents, is considerably greater than in the case of curd obtained by the previously known continuous processes of cheese-making.

The method according to the invention is well suited for introduction of automation, and this is particularly so due to the fact that the transformation of the casein into the insoluble form, during the first state of the non-enzymatic phase of the renneting, takes place in a homogeneous, flowing mass without polymerized micelles, i.e. without separation of whey. Therefore, the viscous mass which is first obtained can easily be cooled continuously by means of a heat exchanger of ordinary type.

The viscous mass obtained when the casein transforms into the insoluble state can be kept for an unlimited time by means of simple cooling; and this, of course, will also greatly simplify the practice of the process. It is also remarkable that the curd obtained by the new method is sufficiently firm, after the formation of the fibers, to be subjected to all kinds of mechanical operations which might be desired, such as drying by means of centrifuging, washing, etc.; and these operations can be carried out without any special precautionary measures.

We claim:

1. In the continuous production of cheese curd, the process comprising the steps of concentrating milk to a dry substance content of at least about 30 percent, renneting the milk at a temperature of 15° to 30° C. for a period of 5 to 15 minutes to insolubilize the casein and obtain a homogeneous non-gelled viscous mass, cooling said mass to a temperature below 10° C., then rapidly heating said viscous mass to a temperature of 25° to 45° C. to polymerize the casein while the mass is divided into a plurality of parallel flows, whereby parallel flows of curd are obtained, washing said curd in an aqueous bath, separating the curd from the bath, and re-collecting the curd to form a homogeneous mass.

2. A process according to claim 1, in which the concentrated milk is renneted at a temperature of about 25° C.

3. A process according to claim 1, in which the milk is concentrated to a dry substance content of 36 percent.

4. A process according to claim 1, in which said renneting is effected with rennet having a concentration of 1 per 10,000, the rennet being added to the milk in the amount of 0.03 percent of the weight of the unconcentrated milk corresponding to the concentrated milk which is processed.

5. A process according to claim 1, in which said rapid heating is effected by injecting thin parallel jets of the viscous mass into said aqueous washing bath, said bath being maintained at a temperature of 25° to 45° C.

6. A process according to claim 5, in which said jets are thread-shaped.

7. A process according to claim 5, in which said jets are lamella-shaped.

8. A process according to claim 5, comprising also the step of dividing said parallel jets lengthwise immediately upon their injection into the bath.

9. A process according to claim 5, comprising also the step of vigorously stirring said bath during said injecting of the jets.

10. A process according to claim 1, in which said rapid heating is effected by passing said plurality of parallel flows through corresponding thin channels and there heating said flows by indirect heat exchange.

11. A process according to claim 1, in which said rapid heating is effected by passing said plurality of parallel flows through corresponding thin channels and there heating said flows by the action of a high-frequency electric field.

12. A process according to claim 1, in which said aqueous bath consists of pure water.

13. A process according to claim 1, in which said aqueous bath is a solution in water of at least one salt of an alkaline earth metal.

14. A process according to claim 13, in which said salt is a calcium salt.

15. A process according to claim 14, in which the calcium salt is calcium chloride.

16. A process according to claim 1, in which the aqueous bath consists of whey of normal composition.

17. A process according to claim 1, in which the aqueous bath consists of diluted whey.

18. A process according to claim 1, comprising also the step of inoculating bacteria into the curd to give to the cheese the particular taste desired in the finished product.

19. A process according to claim 18, in which the bacteria is inoculated into the curd by adding the bacteria to the aqueous bath.

20. A process according to claim 1, comprising also inoculating bacteria into the concentrated milk before said cooling step.

21. A process according to claim 1, in which the concentrated milk is acidified before the renneting step.

22. A process according to claim 1, in which the concentrated milk is acidified by inoculation of acid-producing bacteria into the milk.

23. A process according to claim 1, in which the concentrated milk is acidified by addition of at least one acid thereto.

24. A process according to claim 23, in which the added acid is lactic acid.

25. A process according to claim 1, in which the viscosity of the homogeneous mass obtained during the renneting of the concentrated milk is such, qualitatively estimated, that the surface of the mass will completely and almost instantaneously fuse together again after a furrow has been cut therein.

26. A process according to claim 1, in which the viscosity of the homogeneous viscous mass obtained during the renneting of the concentrated milk is about 90 centipoise at 25° C.

* * * * *